United States Patent
Xiao et al.

(10) Patent No.: US 12,482,395 B2
(45) Date of Patent: Nov. 25, 2025

(54) LUMINANCE COMPENSATION METHOD AND APPARATUS FOR DISPLAY PANEL

(71) Applicant: TCL CHINA STAR OPTOELECTRONICS TECHNOLOGY CO., LTD., Guangdong (CN)

(72) Inventors: Yixin Xiao, Guangdong (CN); Junli Xie, Guangdong (CN); Kaihao Mao, Guangdong (CN); Shunqiang You, Guangdong (CN); Zhixiang Tang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/622,970

(22) Filed: Mar. 31, 2024

(65) Prior Publication Data
US 2025/0218328 A1    Jul. 3, 2025

(30) Foreign Application Priority Data
Dec. 28, 2023  (CN) .......................... 202311844738.1

(51) Int. Cl.
G09G 3/20 (2006.01)

(52) U.S. Cl.
CPC ... G09G 3/2074 (2013.01); *G09G 2320/0233* (2013.01); *G09G 2320/0693* (2013.01)

(58) Field of Classification Search
CPC ......... G09G 3/2074; G09G 2320/0233; G09G 2320/0693
See application file for complete search history.

(56) References Cited

U.S. PATENT DOCUMENTS

| | | | |
|---|---|---|---|
| 2012/0177302 A1* | 7/2012 | Habuka | G06T 3/4038 382/284 |
| 2017/0124928 A1* | 5/2017 | Edwin | H04N 13/344 |

* cited by examiner

Primary Examiner — Chanh D Nguyen
Assistant Examiner — Gloryvid Figueroa-Gibson
(74) Attorney, Agent, or Firm — PV IP PC; Christopher S. Ruprecht; Wei Te Chung

(57) ABSTRACT

A luminance compensation method. According to the method, a central calibration point is acquired on the sampled image. A plurality of third calibration points is generated on the sampled image based on the central calibration point. The sampled image is divided into a plurality of regions to be corrected. A corrected position of each second calibration point in any one of the regions to be corrected is acquired for an initial position of each third calibration point in the region to be corrected. An affine transformation correction is performed on the sampled image based on the corrected positions of all the second calibration points and reference positions of the first calibration points corresponding to the second calibration points, so that a corrected image is acquired. And luminance data of a reference image is compensated to the sampled image.

15 Claims, 5 Drawing Sheets

LUMINANCE COMPENSATION METHOD AND APPARATUS FOR DISPLAY PANEL

CROSS-REFERENCE TO RELATED APPLICATION

This application claims priority to and the benefit of Chinese Patent Application No. 202311844738.1, filed on Dec. 28, 2023, the disclosure of which is incorporated herein by reference in its entirety.

TECHNICAL FIELD

The present disclosure relates to the field of display technologies, and more particularly, to a luminance compensation method and apparatus for a display panel.

BACKGROUND

With the development of display panel technology, users have increasingly high requirements for the quality of the display screen on the display panel. Due to material and processing limitations, some display screens on a current display panel often exhibit technical issues of uneven display.

Currently, camera equipment is commonly used to collect luminance information of display panels for grayscale compensation. However, the images collected by camera equipment have the characteristic of barrel distortion, which leads to a large deviation between the displayed calibration points in the sampled images of display panels and the actual calibration points, making it difficult to accurately extract the region(s) of interest of display panels based on the accurate coordinates of the calibration points, thereby affecting the luminance compensation for display panels.

SUMMARY

The present disclosure provides a luminance compensation method and apparatus for a display panel.

The luminance compensation method for a display panel includes controlling the display panel to display a calibration screen to acquire a sampled image of the display panel, the display panel including a plurality of first calibration points, and the sampled image including a plurality of second calibration points; acquiring a central calibration point from the plurality of second calibration points; generating a plurality of third calibration points disposed in an array based on the central calibration point, and dividing the sampled image into a plurality of regions to be corrected; acquiring a corrected position of each of the second calibration points in any one of the regions to be corrected for an initial position of each of the third calibration points in the region to be corrected; performing an affine transformation correction on the sampled image based on the corrected positions of all the second calibration points and reference positions of the first calibration points corresponding to respective ones of the second calibration points to acquire a corrected image; acquiring luminance compensation data based on the corrected image to perform luminance compensation on the display panel with the luminance compensation data.

The luminance compensation apparatus for a display panel includes: a first acquisition module for controlling the display panel to display a calibration screen to acquire a sampled image of the display panel, the display panel including a plurality of first calibration points, and the sampled image including a plurality of second calibration points; a second acquisition module for acquiring a central calibration point from the plurality of second calibration points; a processing module for generating a plurality of third calibration points arranged in an array based on the central calibration point, and dividing the sampled image into a plurality of regions to be corrected; a computing module for acquiring a corrected position of each of the second calibration points in any one of the regions to be corrected for an initial position of each of the third calibration points in the region to be corrected; a correction module for performing an affine transformation correction on the sampled image based on the corrected positions of all the second calibration points and reference positions of the first calibration points corresponding to respective ones of the second calibration points to acquire a corrected image; a compensation module for acquiring luminance compensation data based on the corrected image to perform luminance compensation on the display panel with the luminance compensation data.

BRIEF DESCRIPTION OF THE DRAWINGS

The technical solution and other beneficial effects of the present disclosure will be apparent from the following detailed description of specific embodiments thereof, taken in conjunction with the accompanying drawings.

DETAILED DESCRIPTION

The technical solution in the embodiments of the present disclosure will be clearly and completely described below with reference to the accompanying drawings. It will be apparent that the described embodiments are only part of the examples of the present disclosure, and not all examples. Based on the embodiments in the present disclosure, all other embodiments acquired by a person skilled in the art without involving any inventive effort are within the scope of the present disclosure.

Figure 1:
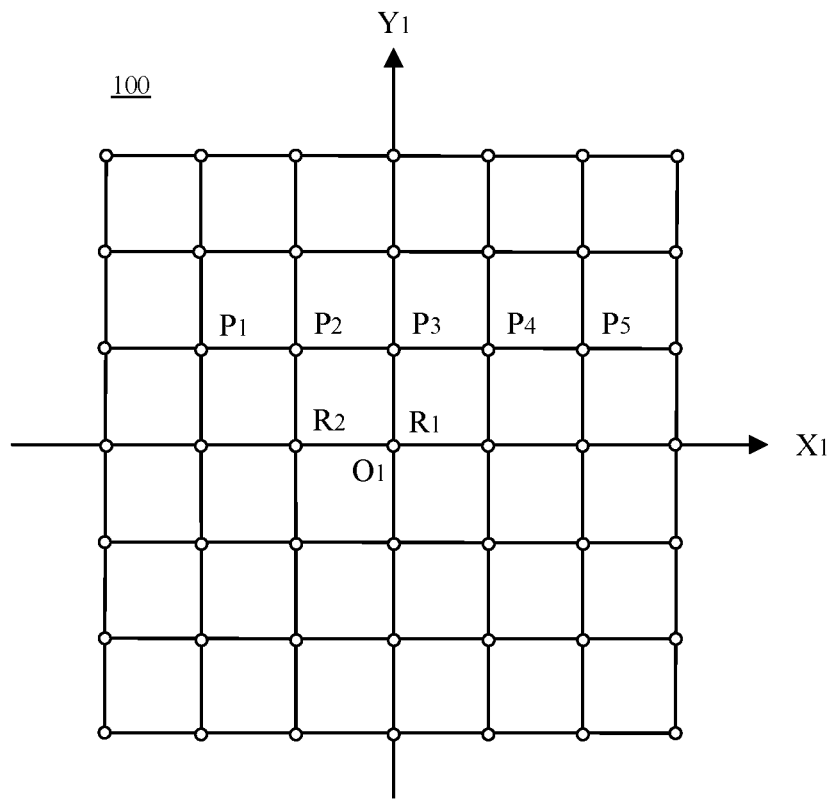
FIG. 1 is a schematic diagram of a calibration screen on a display panel in accordance with the present disclosure.
Figure 2:
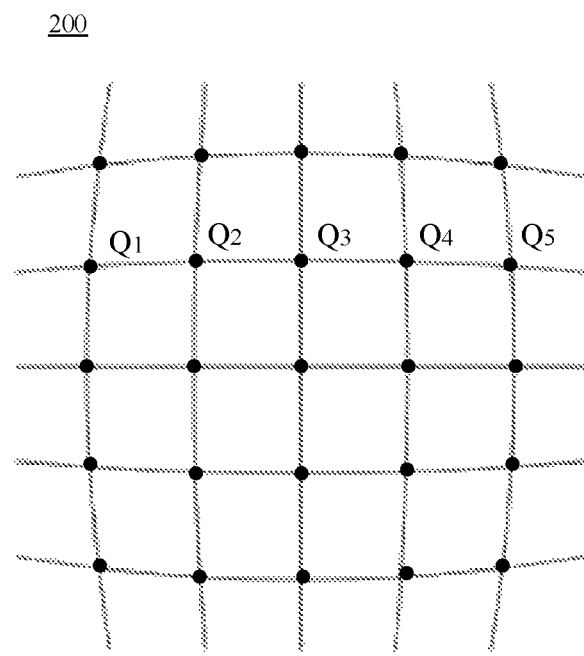
FIG. 2 is a schematic diagram of a first type of a sampled image acquired when a calibration screen is displayed on a display panel in accordance with the present disclosure.

Referring to FIG. 1 and FIG. 2, FIG. 1 is a schematic diagram of a calibration screen on a display panel in accordance with the present disclosure. The display panel (i.e., calibration screen 100 displayed on the display panel) is provided with a plurality of first calibration points (i.e., white dots in the figure) arranged in an array. FIG. 2 is a schematic diagram of a first type of a sampled image 200 acquired by a camera equipment when the calibration screen 100 is displayed on the display panel. A plurality of second calibration points (i.e., black dots in the figure) are provided in the sampled image 200. Due to wide-angle lens(es) of the camera equipment, the captured images encounter with barrel distortion, that is, the sampled image 200 in FIG. 2 is outwardly convex. However, in the related art, the plurality of first calibration points on the display panel and the plurality of second calibration points on the sampled image 200 are generally mapped one by one to for luminance compensation. Since point distances of two adjacent ones of the first calibration points in FIG. 1 are equal, and point distances of two adjacent ones of the second calibration points in FIG. 2 are not equal, the first calibration points in FIG. 1 cannot correspond with the second calibration points in FIG. 2 one by one.

For example, in the five first calibration points P1 to P5 in FIG. 1 and the five second calibration points Q1 to Q5 in FIG. 2, if no barrel distortion occurs in FIG. 2, P1 corresponds with Q1, P2 corresponds with Q2, P3 corresponds with Q3, P4 corresponds with Q4, and P5 corresponds with Q5. However, since the positions of Q1 to Q5 in FIG. 2 are offset, the positions of P1 to P5 do not overlap with respective positions of Q1 to Q5, which causes the existing luminance compensation method to be inaccurate. Based on the above technical problem, the present disclosure provides a luminance compensation method and apparatus for a display panel to solve the above technical problem.

Figure 3:
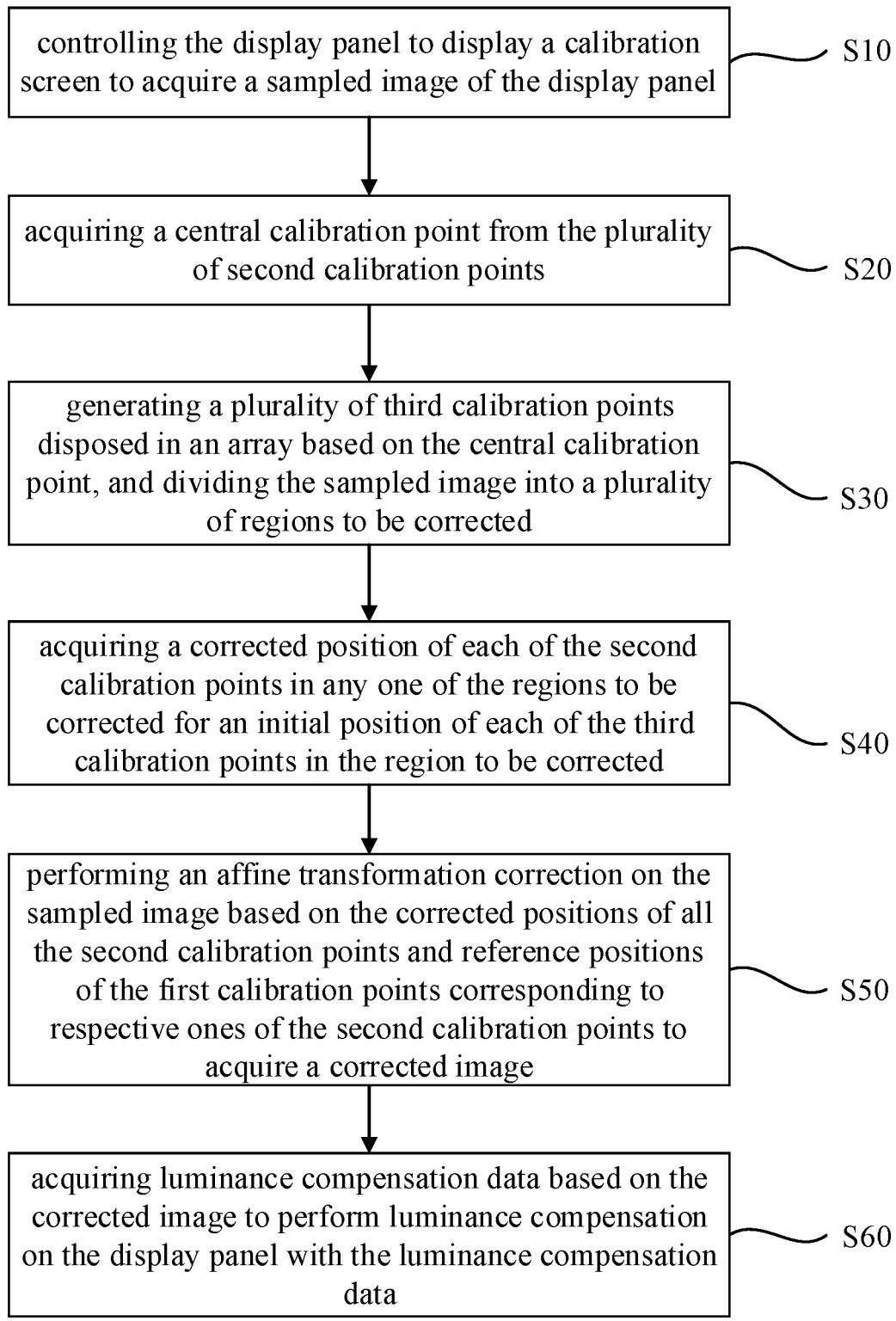
FIG. 3 is a flow chart illustrating steps of the luminance compensation method for a display panel in accordance with the present disclosure.

Referring to FIG. 3, the present disclosure provides a luminance compensation method for a display panel, which includes the following steps S10 to S60.

At step S10, the display panel is controlled to display a calibration screen 100, and a sampled image 200 of the display panel is acquired. The display panel includes a plurality of first calibration points, and the sampled image 200 includes a plurality of second calibration points.

In the present step, referring to FIG. 1, the calibration screen 100 is a designed image to be displayed on the display panel. After the calibration screen 100 is displayed on the display panel, a portion of the sub-pixels are illuminated to form a plurality of first calibration points arranged in an array on the calibration screen 100 of the display panel. The point distances between two adjacent ones of the first calibration points in the transverse direction and the longitudinal direction may be equal. For example, 26*47 first calibration points may be provided on the calibration screen 100, that is, 26 lines and 47 first calibration points per line. The calibration screen 100 in FIG. 1 merely schematically shows 7*7 first calibration points, that is, 7 lines and 7 first calibration points per line.

In the present step, in the configuration of FIG. 1, a region in which each of the first calibration points is located encompasses a plurality of sub-pixels of the display panel, and how many sub-pixels are specifically encompassed in the region in which one of the first calibration points is located may be set according to differences in resolutions of display panels. For example, for a display panel with a resolution of 1920*1080, the region in which one of the first calibration points is located may have 10 sub-pixels.

In the present step, when the calibration screen 100 is displayed on the display panel, the sub-pixels in the regions in which the first calibration points are located emit white light, and the sub-pixels in the regions in which the first calibration points are not located do not emit light, thereby forming the plurality of first calibration points arranged in an array in FIG. 1. Meanwhile, each of the first calibration points has a specific coordinate, and the coordinate of the first calibration point is a centroid coordinate of a region surrounded by a peripheral contour of the first calibration point, and the centroid coordinate is a grayscale center of the region surrounded by the peripheral contour of the first calibration point, or may be a luminance center thereof. For example, a first coordinate system $O_1X_1Y_1$ is established with the center of FIG. 1 as the origin of the coordinate system, and the coordinates of all of the first calibration points in FIG. 1 may thus be known.

In the present step, the display panel of the present disclosure may be a liquid crystal display panel, an OLED display panel, or a micro-LED display panel, which is not limited in the present disclosure.

In the present step, referring to FIG. 2, since images captured by the camera equipment has a characteristic of barrel distortion, the sampled image 200 is overall convex. Meanwhile, the number of the second calibration points is the same as the number of the first calibration points. For example, the sampled image 200 may have 26*47 calibration points, and only 5*5 second calibration points are shown in FIG. 2. Due to image distortion, there are 24 second calibration points located on a periphery not shown in the figure.

In the present step, referring to FIG. 2, the number of sub-pixels encompassed by a second calibration point on the sampled image 200 of the present disclosure is the same as the number of sub-pixels encompassed by a first calibration point. For example, for a display panel having a resolution of 1920*1080, a region in which one of the second calibration points is located may have 10 sub-pixels. Similarly, a coordinate of a second calibration point in the present disclosure is a centroid coordinate of a region surrounded by a peripheral contour of the second calibration point.

Figure 4:
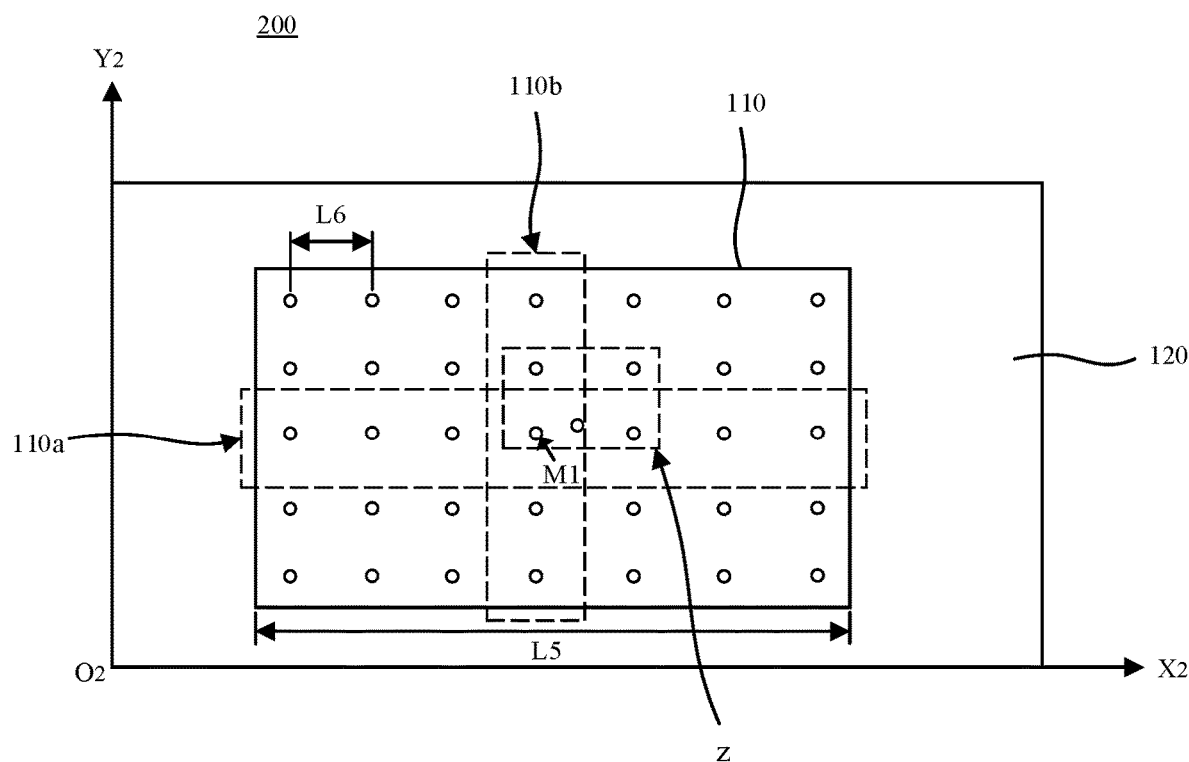
FIG. 4 is a schematic diagram of a second type of a sampled image acquired when a calibration screen is displayed on a display panel in accordance with the present disclosure.

Referring to FIG. 4, FIG. 4 is a schematic diagram of a second type of a sampled image 200 acquired by a camera equipment when the calibration screen 100 is displayed on the display panel. The sampled image 200 of the present disclosure includes, in addition to the image displayed on the display panel, an image of a non-display panel located on a periphery of the display panel. A region in which the image displayed by the display panel locates may be an active image region 110, and a region in which the image of the non-display panel locates may be an inactive image region 120. The second calibration points are all located within the active image region 110. Therefore, according to the present disclosure, there is a need to extract an image of the active image region 110 corresponding to the calibration screen 100 on the sampled image 200 in FIG. 4, and form a mapping matrix according to coordinates of the second calibration points in the active image region 110 and coordinates of the first calibration points on the calibration screen 100 in FIG. 1.

At step S20, a central calibration point is acquired from the plurality of second calibration points.

In the present step, according to the present disclosure, since there is a need to acquire a coordinate of each of the second calibration points after offsetting and then to use the same along with the coordinates of corresponding first calibration points to form a mapping matrix, it is necessary to acquire an addressing calibration point in the active image region 110 of the sampled image 200 and to acquire the coordinate of each of the second calibration points based on the addressing calibration point. In the related art, a center point of the sampled image 200 is generally taken as the addressing calibration point. However, due to the inability of the camera equipment to accurately align the center of the camera equipment with the center of the display panel during capturing, there is an error in acquiring coordinates of calibration points on the sampled image 200.

In the present embodiment, the step S20 may include the following steps S21 to S23.

At step S21, a center point of the sampled image 200 and two or more of the second calibration points disposed adjacent to the center point of the sampled image 200 are acquired.

At step S22, two or more first pitches between the center point and the two or more of the second calibration points are acquired.

At step S23, a second calibration point having a minimum value among the two or more of first pitches is taken as an addressing calibration point, and a coordinate of the central calibration point from the plurality of the second calibration points is acquired according to the addressing calibration point.

Figure 5:
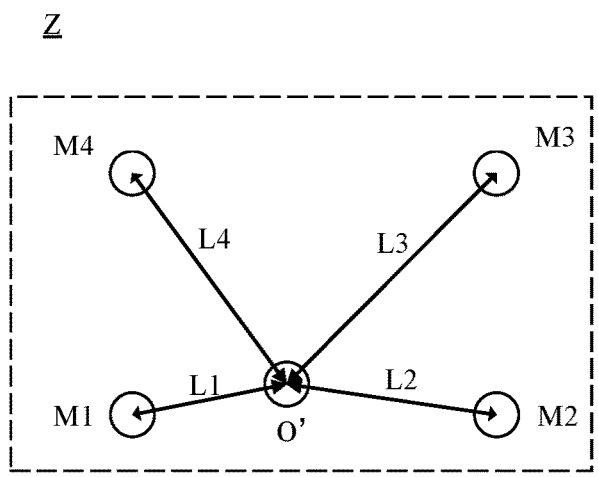
FIG. 5 is an enlarged view of the region Z in FIG. 4.

Referring to FIGS. 4 and 5, a plurality of first pitches between all of the second calibration points and a point O' within a predetermined region are acquired by taking the point O' as a center point of the sampled image 200. For example, four second calibration points M1 to M4 on a periphery of the point O' in FIG. 5 are separated from the point O' by pitches L1 to L4, respectively. When L1 is smaller than each of L2, L3, and L4, the point M1 is taken as the addressing calibration point in the sampled image 200, and the coordinate of the central calibration point among the plurality of second calibration points in the active image region 110 is acquired by using positional information of the addressing calibration point.

In the present embodiment, referring to FIG. 4, the step S23 may include the following steps S231 to S236.

At step S231, a predetermined pitch is acquired.

At step S232, a first region 110a is formed with the addressing calibration point as a center, the predetermined pitch as a breadth of the first region and an extension of the sampled image 200 in a first direction as a length of the first region.

At step S233, a plurality of first coordinate components of a number of first target calibration points among the second calibration points in the first region 110a are acquired with respect to the first direction, and an intermediate value of the plurality of first coordinate components is taken as a coordinate component of the central calibration point of the sampled image 200 in the first direction.

At step S234, a second region 110b is formed with the addressing calibration point as the center, the predetermined pitch as a breadth of the second region and an extension of the sampled image 200 in a second direction as a length of the second region.

At step S235, a plurality of second coordinate components of a number of second target calibration points among the second calibration points in the second region 110b are acquired with respect to the second direction, and an intermediate value of the plurality of second coordinate components is taken as a coordinate component of the central calibration point of the sampled image 200 in the second direction.

At step S236, a coordinate of the central calibration point is determined according to the coordinate component of the central calibration point in the first direction and the coordinate component of the central calibration point in the second direction.

In step S23, a second coordinate system $O_2X_2Y_2$ is established where a first direction may be parallel to a longer side of the display panel, and a second direction may be parallel to a shorter side of the display panel. In the following embodiments, the first direction is taken as the X2 axis and the second direction is taken as the Y2 axis.

In step S231, to acquire the predetermined pitch, a length of the active image region 110 in the first direction X2 and the number/quantity of sub-pixels in the first direction X2 may be acquired first, then a pitch of two adjacent ones of the first calibration points is acquired, and finally the predetermined pitch is determined according to the product of the quotient of the length of the active image region 110 in the first direction X2 and the number/quantity of sub-pixels in the first direction X2 with the pitch of the two adjacent ones of the first calibration points. For example, in the schematic diagram of FIG. 4, the length of the active image region 110 in the first direction X2 may be L5, and the pitch between two adjacent first calibration points on the calibration screen 100 may be L6. Therefore, for a display panel of 1920*1080 resolution, which has 1920 sub-pixels in the first direction X2, the predetermined pitch of the present disclosure may be L5\*L6/1920.

In step S23, after the first region 110a and the second region 110b are acquired, the sub-pixels in the first region 110a and the second region 110b may also subject to binaryzation, that is, the two-dimensional data image is converted from a color image to a gray-white image, and the white bright spot(s) in the corresponding region is/are taken as the second calibration point(s), so as to improve the accuracy of the coordinate(s) of the second calibration point(s).

It should be noted that the predetermined pitch described in the following steps of the present disclosure may all be the predetermined pitch as described in the present step.

In the present embodiment, the step of acquiring a number of first target calibration points from the second calibration points in the first region 110a and a number of second target calibration points from the second calibration points in the second region 110b includes the following.

A first outer contour of each of the second calibration points in the first region 110a and a second outer contour of each of the second calibration points in the second region 110b are acquired. The second calibration point(s) in the first region 110a become(s) the first target calibration point(s) when the area of the first outer contour is greater than or equal to a first threshold (that is, the second calibration point whose first outer contour has an area greater than or equal to a first threshold in the first region is taken as one of the first target calibration points), and the second calibration point(s) in the second region 110b become(s) the second target calibration point(s) when the area of the second outer contour is greater than or equal to the first threshold (that is, the second calibration point whose second outer contour has an area greater than or equal to the first threshold in the second region is taken as one of the second target calibration points).

Referring to FIG. 4, taking the first region 110a as an example, in addition to the second calibration point(s) being the white bright spot(s), there may be light leakage in the edge region(s) of the display panel, therefore, the white bright spot(s) is/are selected as the target calibration point(s) in the corresponding region only when the area and the contour of the white bright spot(s) reach the corresponding threshold. For example, the area of the first outer contour of 7 second calibration points in FIG. 4 is greater than or equal to the first threshold, and therefore the 7 second calibration points are all the first target calibration points in the first region 110a.

Referring to FIG. 4, after acquiring the first target calibration points, the coordinate components of the first target calibration points along the X2 axis on the sampled image 200 are acquired, and the coordinate components of the 7 first target calibration points are sorted along the X2 axis, and the coordinate component of a middle one of the 7 first target calibration points on the X2 axis is taken as the coordinate component of the central calibration point of the active image region 110 in a first direction X2. Similarly, a number of second target calibration points of which the area of the second outer contour is greater than or equal to the first threshold are acquired in the second region 110b, and the coordinate components of the number of second target calibration points are sorted along the Y2 axis, and the coordinate component of a middle one of the number of second target calibration points on the Y2 axis is taken as the coordinate component of the central calibration point of the active image region 110 in a second direction Y2, thereby determining the coordinate of the central calibration point according to the coordinate component of the central calibration point in the first direction X2 and the coordinate component of the central calibration point in the second direction Y2.

In the present embodiment, the first threshold is related to the resolution of the display panel, the size of the display panel, and the number of sub-pixels encompassed by the calibration point(s), for example, the outer outline is at least quasi-circular and enclose at least half of the number of sub-pixels encompassed by the calibration point(s).

At step S30, a plurality of third calibration points arranged in an array are generated based on the central calibration point, and the sampled image 200 is divided into a plurality of regions to be corrected.

In the present step, since the image having the barrel distortion is convex in four different directions, there is an error in acquiring coordinates of other second calibration points using only one central calibration point in the left, right, up and down directions.

Figure 6:
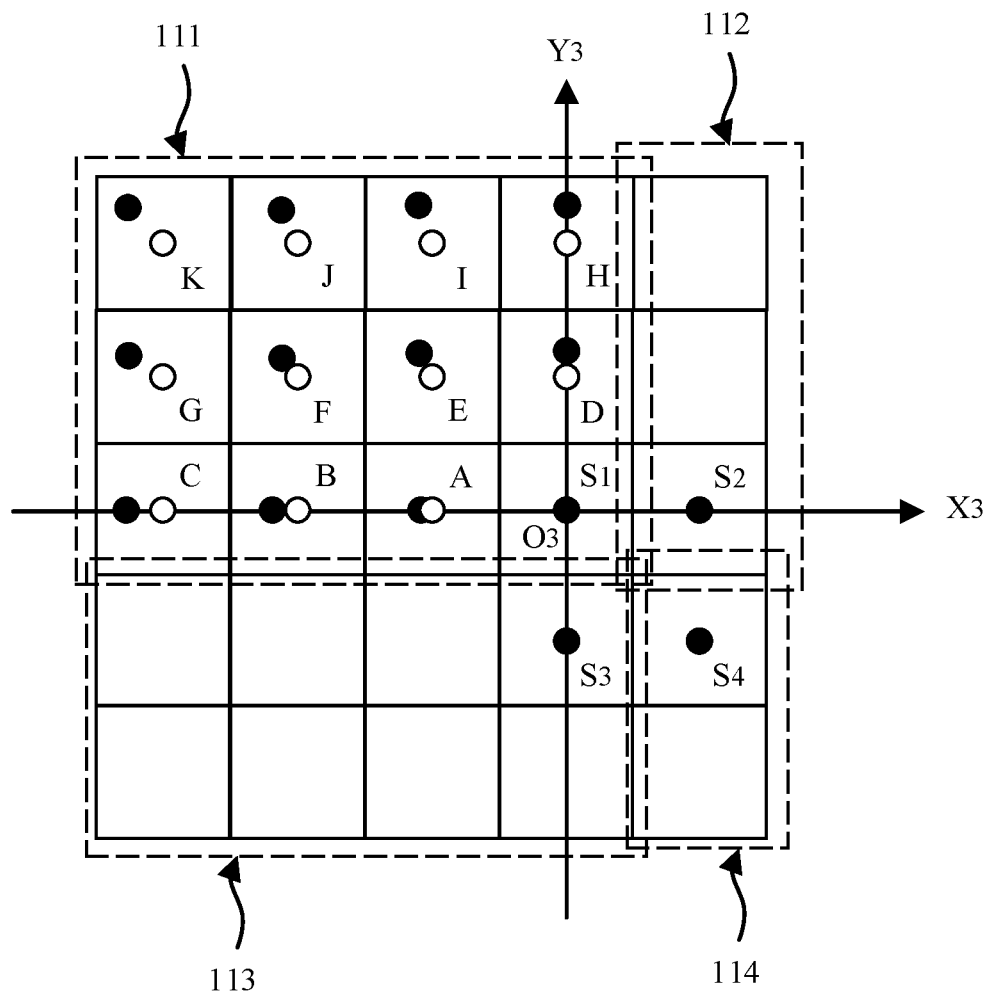
FIG. 6 is a schematic diagram of a portion of the active image region in FIG. 4.

In the present embodiment, referring to FIG. 6, a third coordinate system $O_3X_3Y_3$ is established by taking a centroid of the central calibration point as an origin, and step S30 may include the following steps S31 to S32.

At step S31, a second central calibration point S2, a third central calibration point S3, and a fourth central calibration point S4 are acquired along the first direction X3 and the second direction Y3, respectively, by taking the central calibration point as a first central calibration point S1 and the predetermined pitch as a point distance, wherein lines connecting centroids of the first central calibration point S1, the second central calibration point S2, the third central calibration point S3, and the fourth central calibration point S4 form a square.

At step S32, an active image region 110 of the sampled image 200 is acquired, and the active image region is divided into a first region to be corrected 111, a second region to be corrected 112, a third region to be corrected 113, and a fourth region to be corrected 114 according to the first central calibration point S1, the second central calibration point S2, the third central calibration point S3, and the fourth central calibration point S4, wherein the first central calibration point S1 is a start point of the first region to be corrected 111, the second central calibration point S2 is a start point of the second region to be corrected 112, the third central calibration point S3 is a start point of the third region to be corrected 113, and the fourth central calibration point S4 is a start point of the fourth region to be corrected 114.

Referring to FIG. 6, the second central calibration point S2 of the present disclosure may be on the right side of the first central calibration point S1. The third central calibration point S3 may be on the lower side of the first central calibration point S1. The fourth central calibration point S4 may be on the lower right side of the first central calibration point S1, that is, the fourth central calibration point S4 may be on the lower side of the second central calibration point S2 and the right side of the third central calibration point S3.

It should be noted that the positions of the second central calibration point S2, the third central calibration point S3, and the fourth central calibration point S4 in FIG. 6 are only one embodiment of the present disclosure, and the coordinates of the second central calibration point S2, the third central calibration point S3, and the fourth central calibration point S4 may be acquired from the upper right, the upper left, and the lower left with the first central calibration point S1 as a starting point.

In FIG. 6, an image of the active image region 110 is divided into the first region to be corrected 111, the second region to be corrected 112, the third region to be corrected 113, and the fourth region to be corrected 114. The first central calibration point S1 is taken as the start point of the first region to be corrected 111, and coordinates of all third calibration points in the first region to be corrected 111 are acquired by using the first central calibration point S1. The second central calibration point S2 is taken as the start point of the second region to be corrected 112, and coordinates of all third calibration points in the second region to be corrected 112 are acquired by using the first central calibration point S1. The third central calibration point S3 is taken as the start point of the third region to be corrected 113, and coordinates of all the third calibration points in the third region to be corrected 113 are acquired by using the first central calibration point S1. The fourth central calibration point S4 is taken as the starting point of the fourth region to be corrected 114, and the coordinates of all the third calibration points in the fourth region to be corrected 114 are acquired by using the first central calibration point S1.

In the present embodiment, the step S30 may further include the following step S33.

At step S33, coordinates of the plurality of third calibration points arranged in the array within corresponding regions to be corrected are acquired along the first direction X3 and the second direction Y3, respectively, by taking the first central calibration point S1, the second central calibration point S2, the third central calibration point S3, and the fourth central calibration point S4 as the starting points and the predetermined pitch as the point distance.

Referring to FIG. 6, taking the first central calibration point S1 of the first region to be corrected 111 as an example, since the coordinate of the first central calibration point S1 is known in the present disclosure, by taking the first central calibration point S1 as the start point and the predetermined pitch as the point distance, the first central calibration point S1 is offset to the upper side to acquire a first one of the third calibration points adjacent to the first central calibration point S1 in the second direction Y3. Then, by taking the first one of the third calibration points as the start point and the predetermined pitch as the point distance, and the first one of the third calibration points is offset to the upper side to acquire a second one of the third calibration points adjacent to the first one of the third calibration points in the second direction Y3. And coordinates of all third calibration points on the same line as the first central calibration point S1 in the second direction Y3 are sequentially acquired by analogy.

Next, by taking the first central calibration point S1 as the start point and the predetermined pitch as the point distance, the first central calibration point S1 is offset to the left side to acquire a first one of the third calibration points adjacent to the first central calibration point S1 in the first direction X3. Then, by taking the first one of the third calibration points as the start point and the predetermined pitch as the point distance, the first one of the third calibration points is offset to the left side to acquire a second one of the third calibration points adjacent to the first one of the third calibration points in the first direction X3. And coordinates of all third calibration points on the same line as the first central calibration point S1 in the first direction X3 are sequentially acquired by analogy. Meanwhile, by taking a number of the first ones of the third calibration points in the longitudinal direction Y3 as the start points and the predetermined pitch as the point distance, the first ones of the third calibration points are sequentially offset to the left side to acquire coordinates of all third calibration points in the first region to be corrected 111.

Similarly, the second region to be corrected 112 takes the second central calibration point S2 as the start point, the third region to be corrected 113 takes the third central calibration point S3 as the start point, and the fourth region to be corrected 114 takes the fourth central calibration point S4 as the start point so as to sequentially acquire coordinates of all third calibration points within corresponding regions to be corrected.

In the present embodiment, the number/quantity of the third calibration points, the number/quantity of the second calibration points, and the number/quantity of the first calibration points are the same. For example, the third calibration points, the second calibration points, and the first calibration points may each be a set of points arranged in an array of 26*47, and pitches between any two adjacent third calibration points are equal, and a pitch between two adjacent third calibration points is equal to that between two adjacent first calibration points. Only part of the third calibration points is shown in FIG. 6.

In the present embodiment, for a display panel having a resolution of 1920*1080, the predetermined pitch is L5*L6/1920 in FIG. 6.

Note that the black circles in FIG. 6 represent the second calibration points and the white circles represent the third calibration points.

At step S40, a corrected position of each of the second calibration points in any one of the regions to be corrected is acquired for an initial position of each of the third calibration points in the region to be corrected.

In the present step, since the second calibration points are offset relative to the corresponding first calibration points, it is necessary to acquire the offset of each second calibration point so as to acquire the coordinates for determining the second calibration points.

In the present embodiment, step S40 may include the following steps S411 to S413.

At step S411, a virtual quadrilateral is formed on a periphery of each of the third calibration points by taking the third calibration point as a center.

At step S412, a centroid coordinate of each virtual quadrilateral is acquired based on a displayed grayscale of each sub-pixel in a region surrounded by the virtual quadrilateral.

At step S413, the centroid coordinate of each virtual quadrilateral is determined as a coordinate of the second calibration point located in the corresponding virtual quadrilateral, and the corrected position of each of the second calibration points in the region to be corrected is acquired.

Figure 7:
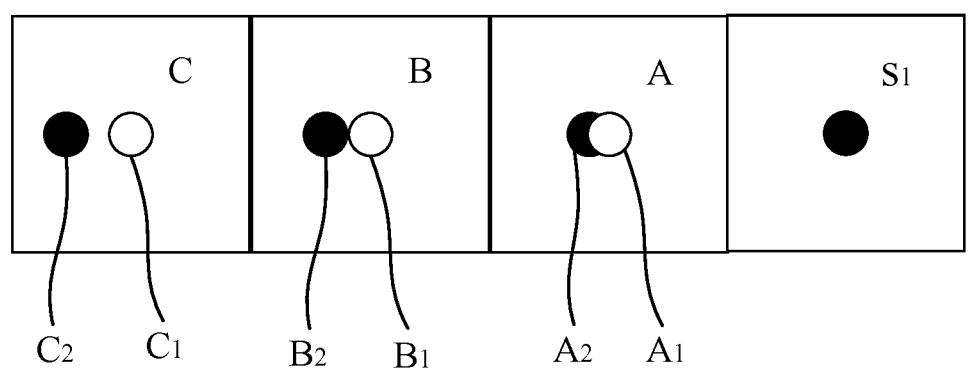
FIG. 7 is an enlarged view of three third calibration points adjacent to the first central calibration point in FIG. 6.

Referring to FIG. 6 and FIG. 7, taking a third calibration point A1 adjacent to the first central calibration point S1 as an example, a first virtual quadrilateral A is formed at a periphery of the point A1 with the first virtual quadrilateral A1 as a center, a centroid coordinate of the first virtual quadrilateral A is acquired based on the displayed grayscale of each sub-pixel in the region surrounded by the first virtual quadrilateral A, and the centroid coordinate of the first virtual quadrilateral A is taken as a coordinate of a second calibration point A2. Meanwhile, coordinates of all the second calibration points except the second calibration point A2 within the first region to be corrected are acquired according to the manner in which the coordinate of the second calibration point A2 is acquired in the first virtual quadrilateral A.

In the present step, since sub-pixels encompassed by the second calibration point are all illuminated, their grayscale value may be 255. Since the grayscale value(s) of the sub-pixel(s) not illuminated in the first virtual quadrilateral A may be 0, the centroid coordinate of the first virtual quadrilateral A refers to a grayscale center of the white picture in the region enclosed by the first virtual quadrilateral A, or may be a luminance center thereof.

Since each second calibration point is offset relative to a respective third calibration point, there may be some second calibration point(s) located outside corresponding virtual quadrilateral(s) or overlapped with the boundary (boundaries) of the corresponding virtual quadrilateral(s). Therefore, in order to ensure that each second calibration point is located in the corresponding virtual quadrilateral, the center coordinate of each virtual quadrilateral needs to be offset according to an offset of a second calibration point corresponding to the first third calibration point.

In the present embodiment, referring to FIGS. 6 and 7, step S40 may further include the following steps S421 to S424.

At step S421, a first virtual quadrilateral is formed on a periphery of a first one of the third calibration points adjacent to the central calibration point by taking the first one of the third calibration points as a center, and a centroid coordinate of the first virtual quadrilateral is acquired based on a displayed grayscale of each sub-pixel in a region surrounded by the first virtual quadrilateral.

At step S422, a first offset of the centroid coordinate of the first virtual quadrilateral relative to the first one of the third calibration points is acquired according to the centroid coordinate of the first virtual quadrilateral and a coordinate of the first one of the third calibration points.

At step S423, an initial position of each of the third calibration points except the first one of the third calibration points is offset according to the first offset, a virtual quadrilateral is formed on a periphery of each of the third calibration points with each of the third calibration points after the offsetting as a center, and a centroid coordinate of each of the virtual quadrilaterals is acquired based on a displayed grayscale of each sub-pixel in a region surrounded by each of the virtual quadrilaterals.

At step S424, the centroid coordinate of each of the virtual quadrilaterals is determined as a coordinate of the second calibration point located in the virtual quadrilateral, and the corrected position of each of the second calibration points in the region to be corrected is acquired.

In the present step, the virtual quadrilateral may be a square, that is, a virtual square is formed with the first one of the third calibration points as the center and with a predetermined pitch as the side length.

Referring to FIG. 7, a third calibration point adjacent to the first central calibration point S1 is point A1, and a first virtual quadrilateral A is formed at the periphery of the point A1 with the point A1 as a center. The centroid coordinate of the first virtual quadrilateral A, i.e., the coordinate of the second calibration point A2, is acquired based on the displayed grayscale of each sub-pixel in the region surrounded by the first virtual quadrilateral A.

In the present step, since the coordinate of the first central calibration point S1 and the coordinate of the point A1 are both known, and the side length of the first virtual quadrilateral A is known, the centroid coordinate of the first virtual quadrilateral A may be directly acquired to acquire the coordinate of the second calibration point A2, thereby acquiring the first offset of the second calibration point A2 relative to the third calibration point A1 in the first virtual quadrilateral A. Besides, all the third calibration points in the first region to be corrected 111 may be offset according to the first offset, so that the second calibration points are all located in respective virtual quadrilaterals formed by the third calibration points. And the corresponding virtual quadrilateral is formed on the periphery of each of the third calibration points with each of the third calibration points after the offsetting as a center, and the centroid coordinate of each of the virtual quadrilaterals is acquired based on the displayed grayscale of each sub-pixel in the region surrounded by each of the virtual quadrilaterals.

Since each second calibration point is offset with respect to a respective third calibration point, and the offset becomes more and more serious in the direction from the center to the outside, even if the centers of the virtual quadrilaterals are offset according to the first offset, there may still be a portion of the second calibration points located outside the corresponding virtual quadrilateral(s) or overlapped with the boundary (boundaries) of the corresponding virtual quadrilateral(s).

In the present embodiment, referring to FIGS. 6 and 7, the step S40 may further include the following steps S431 to S437.

At step S431, a first virtual quadrilateral is formed on a periphery of a first one of the third calibration points adjacent to the central calibration point with the first one of the third calibration points as a center, and a centroid coordinate of the first virtual quadrilateral is acquired based on a displayed grayscale of each sub-pixel in a region surrounded by the first virtual quadrilateral.

At step S432, a first offset of the centroid coordinate of the first virtual quadrilateral relative to the first one of the third calibration points is acquired according to the centroid coordinate of the first virtual quadrilateral and a coordinate of the first one of the third calibration points.

At step S433, an initial position of a second one of third calibration points adjacent to the first one of the third calibration points is offset according to the first offset, a second virtual quadrilateral is formed on a periphery of the second one of the third calibration points with the second one of the third calibration points after offsetting as a center, and a centroid coordinate of the second virtual quadrilateral is acquired based on a displayed grayscale of each sub-pixel in a region surrounded by the second virtual quadrilateral.

At step S434, a second offset of the centroid coordinate of the second virtual quadrilateral relative to the second one of the third calibration points is acquired according to the centroid coordinate of the second virtual quadrilateral and a coordinate of the second one of the third calibration points.

At step S435, an initial position of a third one of the third calibration points adjacent to the second one of the third calibration points is offset according to the second offset, a third virtual quadrilateral is formed a periphery of the third one of the third calibration points with the third one of the third calibration points after offsetting as a center, and a centroid coordinate of the third virtual quadrilateral is acquired based on a displayed grayscale of each sub-pixel in a region surrounded by the third virtual quadrilateral.

At step S436, the above steps are repeated to acquire centroid coordinates of all virtual quadrilaterals in the region to be corrected.

At step S437, the centroid coordinate of each of the virtual quadrilaterals is determined as a coordinate of the second calibration point located in the virtual quadrilateral, and the corrected position of each of the second calibration points in the region to be corrected is acquired.

In the present step, referring to FIG. 7, after acquiring the first offset of the second calibration point A2 in the first virtual quadrilateral A relative to the third calibration point A1, the coordinate of the third calibration point B1 in the second virtual quadrilateral B is offset according to the first offset. Meanwhile, the centroid coordinate of the second virtual quadrilateral B after the offsetting is acquired so as to acquire the coordinate of the second calibration point B2 in the second virtual quadrilateral B, and in turn acquire the second offset of the second calibration point B2 in the second virtual quadrilateral B relative to the third calibration point B1 according to the coordinate of the third calibration point B1 and the coordinate of the second calibration point B2 in the second virtual quadrilateral B. Therefore, the actual offset of the second calibration point B2 in the second virtual quadrilateral B relative to the third calibration point B1 is the sum of the first offset and the second offset.

Next, the coordinate of the third one of the third calibration points C1 is offset according to the first offset and the second offset, meanwhile the centroid coordinate of the third virtual quadrilateral C after the offsetting is acquired so as to acquire the coordinate of the second calibration point C2 in the third virtual quadrilateral C, and in turn acquire the third offset of the second calibration point C2 in the third virtual quadrilateral C relative to the third calibration point C1 according to the coordinate of the third calibration point C1 and the coordinate of the second calibration point C2 in the third virtual quadrilateral C. Therefore, the actual offset of the second calibration point C2 in the third virtual quadrilateral C relative to the third calibration point C1 is the sum of the first offset, the second offset, and the third offset.

Finally, the above steps are repeated to acquire the coordinates of all second calibration points in the first region to be corrected 111.

Similarly, coordinates of the second calibration points in the second region to be corrected 112, in the third region to be corrected 113, and in the fourth region to be corrected 114 are acquired according to the manner in which the second calibration points in the first region to be corrected 111 are acquired.

Note that in the structure of FIG. 6, the offset of the second calibration points relative to respective third calibration points in the virtual quadrilateral D may be directly acquired, the virtual quadrilateral E may be adjusted according to the offset in the virtual quadrilateral D, the virtual quadrilateral F may be adjusted according to the offset in the virtual quadrilateral E, and the virtual quadrilateral G may be adjusted according to the offset in the virtual quadrilateral F. Next, the virtual quadrilateral H may be adjusted according to the offset in the virtual quadrilateral D, the virtual quadrilateral I may be adjusted according to the offset in the virtual quadrilateral H, the virtual quadrilateral J may be adjusted according to the offset in the virtual quadrilateral I, and the virtual quadrilateral K may be adjusted according to the offset in the virtual quadrilateral J.

At step S50, an affine transformation correction is performed on the sampled image based on the corrected positions of all the second calibration points and reference positions of the first calibration points corresponding to respective ones of the second calibration points to acquire a corrected image.

Since the first calibration points and the second calibration points each encompasses a plurality of sub-pixels, and the luminance compensation is the compensation between sub-pixels, that is, the luminance data of a sub-pixel in the calibration screen 100 is compensated onto a corresponding sub-pixel in the active image region 110 of the sampled image 200, after the coordinate of each first calibration point and the coordinate of the corresponding second calibration point are acquired, the sampled image 200 needs to be corrected according to the coordinates of the first calibration point and the second calibration point so that the coordinate of each sub-pixel in the calibration screen 100 correspond to the coordinate of each sub-pixel in the active image region 110 of the corresponding sampled image 200.

In the present embodiment, step S50 may include the following step S51 to S53.

At step S51, four adjacent first calibration points for which lines connecting centroids of the four first calibration points form a first quadrilateral are taken as a first mapping group, and four adjacent second calibration points for which lines connecting centroids of the four second calibration points form a second quadrilateral are taken as a second mapping group, and a mapping matrix is formed by the first mapping group and the corresponding second mapping group.

At step S52, one or more correction coefficients are determined based on the coordinates of the first calibration points in the first mapping group and the coordinates of the second calibration points in the corresponding second mapping group.

At step S53, an affine transform correction is performed on the sampled image 200 based on the one or more correction coefficients to acquire a corrected image.

In the present step, referring to FIG. 6, the four second calibration points S1, A, E, and D in FIG. 5 are taken as the second mapping group, meanwhile the four first calibration points corresponding to the point R1, R2, P2, and P3 in the calibration screen 100 in FIG. 1 are taken as the first mapping group. One or more correction coefficients are determined according to the coordinates of the first calibration points in the first mapping group and the coordinates of the second calibration points in the second mapping group. Finally, the image of the region enclosed by the lines connecting the centroids of the four second calibration points in the second mapping group is corrected utilizing the affine transformation and according to the correction coefficient(s) of the second mapping group.

In the present embodiment, since the offsets of the second calibration points at different positions are different, the second mapping groups formed by four different second calibration points each have different correction coefficients with the corresponding first mapping group. In the present disclosure, a mapping matrix is formed based on the four adjacent second calibration points for which lines connecting the four second calibration points form a quadrilateral and the corresponding four first calibration points. Each mapping matrix has separate correction coefficient(s), and then the sampled image 200 is corrected by the affine transformation to acquire a corrected image.

At step S60, luminance compensation data is acquired based on the corrected image to perform luminance compensation on the display panel with the luminance compensation data.

In the present step, since the sub-pixels of the corrected image correspond to the sub-pixels in the calibration screen 100 one by one, the luminance compensation data may be acquired according to the difference between the displayed grayscale of each sub-pixel in the calibration screen 100 and the displayed grayscale of each sub-pixel in the corrected image, and the luminance of the display panel may be compensated based on the luminance compensation data.

The present disclosure relates to a luminance compensation method and apparatus for a display panel; according to the method, a central calibration point is acquired on the sampled image 200, a plurality of third calibration points are generated on the sampled image 200 based on the central calibration point, the sampled image 200 is divided into a plurality of regions to be corrected; next, a corrected position of each second calibration point in any one of the regions to be corrected is acquired for an initial position of each third calibration point in the region to be corrected; and finally, an affine transformation correction is performed on the sampled image 200 based on the corrected positions of all the second calibration points and reference positions of the first calibration points corresponding to the second calibration points, so that a corrected image is acquired, and luminance data of a reference image is compensated to the sampled image 200, thereby solving the technical problem that the calibration point(s) of the sampled image 200 of the display panel deviate(s) greatly from the actual calibration point(s).

Figure 8:
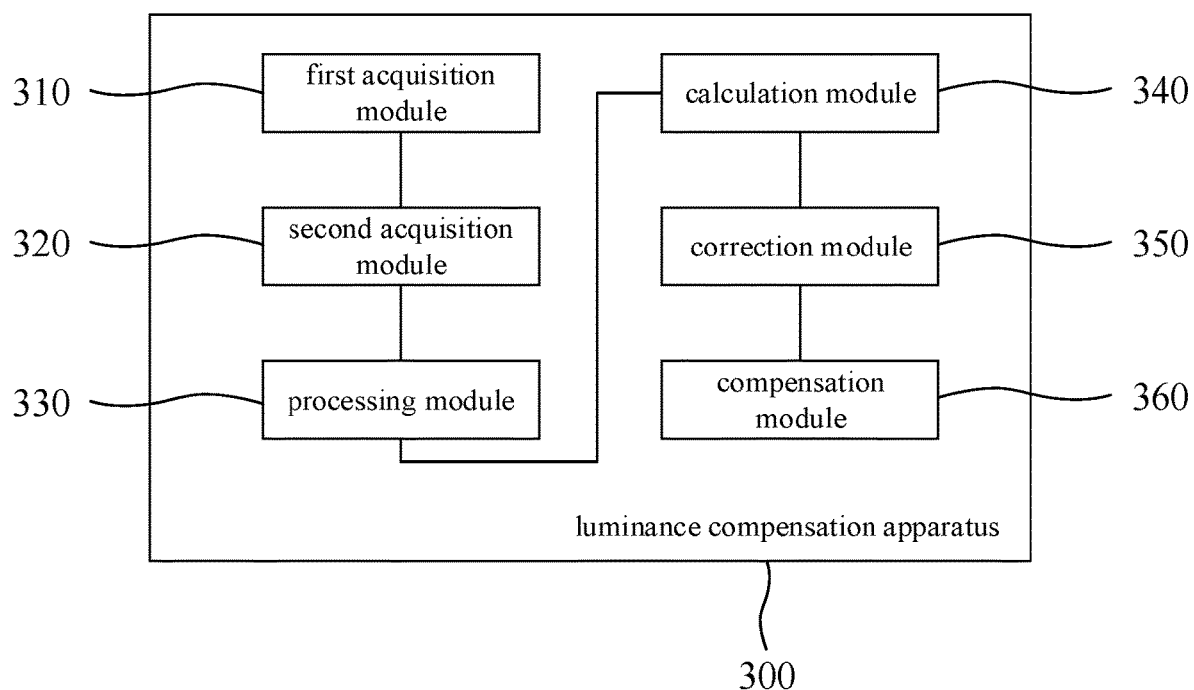
FIG. 8 is a schematic diagram of a structure of a luminance compensation apparatus for a display panel according to the present disclosure.

Referring to FIG. 8, the present disclosure further provides a luminance compensation apparatus 300 for a display panel, which includes a first acquisition module 310, a second acquisition module 320, a processing module 330, a calculation module 340, a correction module 350, and a compensation module 360.

In the present embodiment, the first acquisition module 310 is used for controlling the display panel to display a calibration screen to acquire a sampled image of the display panel, the display panel including a plurality of first calibration points, and the sampled image including a plurality of second calibration points; the second acquisition module 320 is used for acquiring a central calibration point from the plurality of second calibration points; the processing module 330 is used for generating a plurality of third calibration points disposed in an array based on the central calibration point, and dividing the sampled image into a plurality of regions to be corrected; the calculation module 340 is used for acquiring a corrected position of each of the second calibration points in any one of the regions to be corrected for an initial position of each of the third calibration points in the region to be corrected; the correction module 350 is used for performing an affine transformation correction on the sampled image based on the corrected positions of all the second calibration points and reference positions of the first calibration points corresponding to respective ones of the second calibration points to acquire a corrected image; the compensation module 360 is used for acquiring luminance compensation data based on the corrected image to perform luminance compensation on the display panel with the luminance compensation data.

The luminance compensation apparatus 300 of the present disclosure is further used for forming a virtual quadrilateral on a periphery of each of the third calibration points by taking the third calibration point as a center; acquiring a centroid coordinate of each virtual quadrilateral based on a displayed grayscale of each sub-pixel in a region surrounded by the virtual quadrilateral; determining the centroid coordinate of each virtual quadrilateral as a coordinate of the second calibration point located in the corresponding virtual quadrilateral, and acquiring the corrected position of each of the second calibration points in the region to be corrected.

The luminance compensation apparatus 300 of the present disclosure is further used for forming a first virtual quadrilateral on a periphery of a first one of the third calibration points adjacent to the central calibration point by taking the first one of the third calibration points as a center, and acquiring a centroid coordinate of the first virtual quadrilateral based on a displayed grayscale of each sub-pixel in a region surrounded by the first virtual quadrilateral; acquiring a first offset of the centroid coordinate of the first virtual quadrilateral relative to the first one of the third calibration points according to the centroid coordinate of the first virtual quadrilateral and a coordinate of the first one of the third calibration points; offsetting an initial position of each of the third calibration points except the first one of the third calibration points according to the first offset, forming a virtual quadrilateral on a periphery of each of the third calibration points with each of the third calibration points after the offsetting as a center, and acquiring a centroid coordinate of each of the virtual quadrilaterals based on a displayed grayscale of each sub-pixel in a region surrounded by each of the virtual quadrilaterals; determining the centroid coordinate of each of the virtual quadrilaterals as a coordinate of the second calibration point located in the virtual quadrilateral, and acquiring the corrected position of each of the second calibration points in the region to be corrected.

The luminance compensation apparatus 300 of the present disclosure is further used for forming a first virtual quadrilateral on a periphery of a first one of the third calibration points adjacent to the central calibration point with the first one of the third calibration points as a center, and acquiring a centroid coordinate of the first virtual quadrilateral based on a displayed grayscale of each sub-pixel in a region surrounded by the first virtual quadrilateral; acquiring a first offset of the centroid coordinate of the first virtual quadrilateral relative to the first one of the third calibration points according to the centroid coordinate of the first virtual quadrilateral and a coordinate of the first one of the third calibration points; offsetting an initial position of a second one of third calibration points adjacent to the first one of the third calibration points according to the first offset, forming a second virtual quadrilateral on a periphery of the second one of the third calibration points with the second one of the third calibration points after offsetting as a center, and acquiring a centroid coordinate of the second virtual quadrilateral based on a displayed grayscale of each sub-pixel in a region surrounded by the second virtual quadrilateral; acquiring a second offset of the centroid coordinate of the second virtual quadrilateral relative to the second one of the third calibration points according to the centroid coordinate of the second virtual quadrilateral and a coordinate of the second one of the third calibration points; offsetting an initial position of a third one of the third calibration points adjacent to the second one of the third calibration points according to the second offset, forming a third virtual quadrilateral a periphery of the third one of the third calibration points with the third one of the third calibration points after offsetting as a center, and acquiring a centroid coordinate of the third virtual quadrilateral based on a displayed grayscale of each sub-pixel in a region surrounded by the third virtual quadrilateral; repeating the above steps to acquire centroid coordinates of all virtual quadrilaterals in the region to be corrected; determining the centroid coordinate of each of the virtual quadrilaterals as a coordinate of the second calibration point located in the virtual quadrilateral, and acquiring the corrected position of each of the second calibration points in the region to be corrected.

The luminance compensation apparatus 300 of the present disclosure is further used for acquiring a center point of the sampled image and two or more of the second calibration points disposed adjacent to the center point of the sampled image; acquiring two or more first pitches between the center point and the two or more of the second calibration points; taking a second calibration point having a minimum value among the two or more first pitches as an addressing calibration point, and acquiring a coordinate of the central calibration point from the plurality of the second calibration points according to the addressing calibration point.

The luminance compensation apparatus 300 of the present disclosure is further used for acquiring a predetermined pitch; forming a first region with the addressing calibration point as a center, the predetermined pitch as a breadth of the first region and an extension of the sampled image in a first direction as a length of the first region; acquiring a plurality of first coordinate components of a number of first target calibration points among the second calibration points in the first region with respect to the first direction, and taking an intermediate value of the plurality of first coordinate components as a coordinate component of the central calibration point of the sampled image in the first direction; forming a second region with the addressing calibration point as the center, the predetermined pitch as a breadth of the second region and an extension of the sampled image in the second direction as a length of the second region; acquiring a plurality of second coordinate components of a number of second target calibration points among the second calibration points in the second region with respect to a second direction, and taking an intermediate value of the plurality of second coordinate components as a coordinate component of the central calibration point of the sampled image in the second direction; determining a coordinate of the central calibration point according to the coordinate component of the central calibration point in the first direction and the coordinate component of the central calibration point in the second direction; wherein the first direction is parallel to a longer side of the display panel, and the second direction is parallel to a shorter side of the display panel.

The luminance compensation apparatus 300 of the present disclosure is further used for acquiring a first outer contour of each of the second calibration points in the first region and a second outer contour of each of the second calibration points in the second region; taking the second calibration point whose first outer contour has an area greater than or equal to a first threshold in the first region as one of the first target calibration points, and taking the second calibration point whose second outer contour has an area greater than or equal to the first threshold in the second region as one of the second target calibration points.

The luminance compensation apparatus 300 of the present disclosure is further used for acquiring a second central calibration point, a third central calibration point, and a fourth central calibration point along the first direction and the second direction, respectively, by taking the central calibration point as a first central calibration point and the predetermined pitch as a point distance, wherein lines connecting centroids of the first central calibration point, the second central calibration point, the third central calibration point, and the fourth central calibration point form a square; acquiring an active image region of the sampled image, and dividing the active image region into a first region to be corrected, a second region to be corrected, a third region to be corrected, and a fourth region to be corrected according to the first central calibration point, the second central calibration point, the third central calibration point, and the fourth central calibration point, wherein the first central calibration point is a start point of the first region to be corrected, the second central calibration point is a start point of the second region to be corrected, the third central calibration point is a start point of the third region to be corrected, and the fourth central calibration point is a start point of the fourth region to be corrected; acquiring coordinates of the plurality of third calibration points arranged in the array within corresponding regions to be corrected along the first direction and the second direction, respectively, by taking the first central calibration point, the second central calibration point, the third central calibration point, and the fourth central calibration point as the starting points and the predetermined pitch as the point distance; wherein a quantity of the third calibration points, a quantity of the second calibration points, and a quantity of the first calibration points are the same.

The luminance compensation apparatus 300 of the present disclosure is further used for acquiring a length of the active image region in the first direction and a quantity of sub-pixels in the first direction; acquiring a pitch of two adjacent ones of the first calibration points; determining the predetermined pitch according to a product of a quotient of the length of the active image region in the first direction and the quantity of sub-pixels in the first direction with the pitch of the two adjacent ones of the first calibration points.

It should be noted that the luminance compensation apparatus 300 of the present disclosure may include a display panel and an imaging device, or the imaging device may be integrated on the display panel.

In the above-mentioned embodiments, the description of each embodiment has its own emphasis, and portions not described in detail in a certain embodiment may be referred to the related description of other embodiments.

Those of ordinary skill in the art can understand that all or part of the processes in the methods of the above embodiments can be completed by instructing relevant hardware through a computer program. The computer program can be stored in a non-volatile computer-readable storage medium. The computer program when executed may include the processes of the embodiments of the above methods. Any reference to memory, storage, database or other media used in the various embodiments provided by the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRS-DRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

Unless otherwise stated, it should be understood that terms such as "processing", "computing", "calculating", "identifying" and the like refer to actions and/or processes of a computer or computing system, or similar electronic computing device. The computing system or similar electronic computing device manipulates and/or converts data represented as physical (e.g., electronic) quantities within the computing system's registers and/or memory, converts such data into other data similarly represented as physical quantities within a computing system memory or register or other such information memory, transmission or mobile terminal. In this context, the embodiments are not limited. The term "coupled" may be used herein to refer to any type of relationship, direct or indirect, between the components under discussion, and may apply to electrical, mechanical, fluid, optical, electromagnetic, electromechanical, or other connections. In addition, the terms "first", "second", etc. are used herein only to facilitate discussion, and have no specific temporal or chronological meaning unless otherwise stated.

In addition, it is obvious that the word "comprising/including" does not exclude other elements or steps, and the singular forms do not exclude the plural forms.

The luminance compensation method and apparatus for the display panel provided in the embodiments of the present disclosure are described in detail above, and the principles and embodiments of the present disclosure are described herein using specific examples. The description of the above embodiments is merely intended to help understand the technical solutions and the core ideas of the present disclosure. It will be appreciated by those of ordinary skill in the art that modifications may still be made to the technical solutions described in the foregoing embodiments, or equivalents may be made to some of the technical features therein. These modifications or substitutions do not depart the essence of the corresponding technical solutions from the scope of the technical solutions of the embodiments of the present disclosure.

What is claimed is:

1. A luminance compensation method for a display panel, comprising:
controlling the display panel to display a calibration screen to acquire a sampled image of the display panel, the display panel comprising a plurality of first calibration points, and the sampled image comprising a plurality of second calibration points;
acquiring a central calibration point from the plurality of second calibration points;
generating a plurality of third calibration points disposed in an array based on the central calibration point, and dividing the sampled image into a plurality of regions to be corrected;
acquiring a corrected position of each of the second calibration points in any one of the regions to be corrected for an initial position of each of the third calibration points in the region to be corrected;
performing an affine transformation correction on the sampled image based on the corrected positions of all the second calibration points and reference positions of the first calibration points corresponding to respective ones of the second calibration points to acquire a corrected image; and
acquiring luminance compensation data based on the corrected image to perform luminance compensation on the display panel with the luminance compensation data:
wherein acquiring the corrected position of each of the second calibration points in any one of the regions to be corrected for the initial position of each of the third calibration points in the region to be corrected comprises:
forming a first virtual quadrilateral on a periphery of a first one of the third calibration points adjacent to the central calibration point by taking the first one of the third calibration points as a center, and acquiring a centroid coordinate of the first virtual quadrilateral based on a displayed grayscale of each sub-pixel in a region surrounded by the first virtual quadrilateral;

acquiring a first offset of the centroid coordinate of the first virtual quadrilateral relative to the first one of the third calibration points according to the centroid coordinate of the first virtual quadrilateral and a coordinate of the first one of the third calibration points;

offsetting an initial position of each of the third calibration points except the first one of the third calibration points according to the first offset, forming a virtual quadrilateral on a periphery of each of the third calibration points with each of the third calibration points after the offsetting as a center, and acquiring a centroid coordinate of each of the virtual quadrilaterals based on a displayed grayscale of each sub-pixel in a region surrounded by each of the virtual quadrilaterals; and determining the centroid coordinate of each of the virtual quadrilaterals as a coordinate of the second calibration point located in the virtual quadrilateral, and acquiring the corrected position of each of the second calibration points in the region to be corrected.

2. The luminance compensation method for a display panel according to claim 1, wherein acquiring the central calibration point from the plurality of second calibration points comprises:

acquiring a center point of the sampled image and two or more of the second calibration points disposed adjacent to the center point of the sampled image;

acquiring two or more first pitches between the center point and the two or more of the second calibration points; and taking a second calibration point having a minimum value among the two or more first pitches as an addressing calibration point, and acquiring a coordinate of the central calibration point from the plurality of the second calibration points according to the addressing calibration point.

3. The luminance compensation method for a display panel according to claim 2, wherein acquiring the coordinate of the central calibration point among the plurality of second calibration points according to the addressing calibration point comprises:

acquiring a predetermined pitch;

forming a first region with the addressing calibration point as a center, the predetermined pitch as a breadth of the first region and an extension of the sampled image in a first direction as a length of the first region;

acquiring a plurality of first coordinate components of a number of first target calibration points among the second calibration points in the first region with respect to the first direction, and taking an intermediate value of the plurality of first coordinate components as a coordinate component of the central calibration point of the sampled image in the first direction;

forming a second region with the addressing calibration point as the center, the predetermined pitch as a breadth of the second region and an extension of the sampled image in a second direction as a length of the second region;

acquiring a plurality of second coordinate components of a number of second target calibration points among the second calibration points in the second region with respect to the second direction, and taking an intermediate value of the plurality of second coordinate components as a coordinate component of the central calibration point of the sampled image in the second direction; and determining a coordinate of the central calibration point according to the coordinate component of the central calibration point in the first direction and the coordinate component of the central calibration point in the second direction;

wherein the first direction is parallel to a longer side of the display panel, and the second direction is parallel to a shorter side of the display panel.

4. The luminance compensation method for a display panel according to claim 3, wherein after the first region and the second region are formed, sub-pixels in the first region and the second region are subject to binaryzation.

5. The luminance compensation method for a display panel according to claim 3, wherein acquiring a number of first target calibration points among the second calibration points in the first region and a number of second target calibration points among the second calibration points in the second region comprises:

acquiring a first outer contour of each of the second calibration points in the first region and a second outer contour of each of the second calibration points in the second region;

taking the second calibration point whose first outer contour has an area greater than or equal to a first threshold in the first region as one of the first target calibration points, and taking the second calibration point whose second outer contour has an area greater than or equal to the first threshold in the second region as one of the second target calibration points.

6. The luminance compensation method for a display panel according to claim 3, wherein generating the plurality of third calibration points disposed in the array based on the central calibration point, and dividing the sampled image into the plurality of regions to be corrected comprises:

acquiring a second central calibration point, a third central calibration point, and a fourth central calibration point along the first direction and the second direction, respectively, by taking the central calibration point as a first central calibration point and the predetermined pitch as a point distance, wherein lines connecting centroids of the first central calibration point, the second central calibration point, the third central calibration point, and the fourth central calibration point form a square;

acquiring an active image region of the sampled image, and dividing the active image region into a first region to be corrected, a second region to be corrected, a third region to be corrected, and a fourth region to be corrected according to the first central calibration point, the second central calibration point, the third central calibration point, and the fourth central calibration point, wherein the first central calibration point is a start point of the first region to be corrected, the second central calibration point is a start point of the second region to be corrected, the third central calibration point is a start point of the third region to be corrected, and the fourth central calibration point is a start point of the fourth region to be corrected; and acquiring coordinates of the plurality of third calibration points arranged in the array within corresponding regions to be corrected along the first direction and the second direction, respectively, by taking the first central calibration point, the second central calibration point, the third central calibration point, and the fourth central calibration point as the starting points and the predetermined pitch as the point distance;

wherein a quantity of the third calibration points, a quantity of the second calibration points, and a quantity of the first calibration points are the same.

7. The luminance compensation method for a display panel according to claim 3, wherein the sampled image comprises an active image region and an inactive image region located at a periphery of the active image region, and acquiring a predetermined pitch comprises:

acquiring a length of the active image region in the first direction and a quantity of sub-pixels in the first direction;

acquiring a pitch of two adjacent ones of the first calibration points; and determining the predetermined pitch according to a product of a quotient of the length of the active image region in the first direction and the quantity of sub-pixels in the first direction with the pitch of the two adjacent ones of the first calibration points.

8. A luminance compensation method for a display panel, comprising:

controlling the display panel to display a calibration screen to acquire a sampled image of the display panel, the display panel comprising a plurality of first calibration points, and the sampled image comprising a plurality of second calibration points;

acquiring a central calibration point from the plurality of second calibration points;

generating a plurality of third calibration points disposed in an array based on the central calibration point, and dividing the sampled image into a plurality of regions to be corrected;

acquiring a corrected position of each of the second calibration points in any one of the regions to be corrected for an initial position of each of the third calibration points in the region to be corrected;

performing an affine transformation correction on the sampled image based on the corrected positions of all the second calibration points and reference positions of the first calibration points corresponding to respective ones of the second calibration points to acquire a corrected image; and acquiring luminance compensation data based on the corrected image to perform luminance compensation on the display panel with the luminance compensation data;

wherein acquiring the corrected position of each of the second calibration points in any one of the regions to be corrected for the initial position of each of the third calibration points in the region to be corrected comprises:

forming a first virtual quadrilateral on a periphery of a first one of the third calibration points adjacent to the central calibration point with the first one of the third calibration points as a center, and acquiring a centroid coordinate of the first virtual quadrilateral based on a displayed grayscale of each sub-pixel in a region surrounded by the first virtual quadrilateral;

acquiring a first offset of the centroid coordinate of the first virtual quadrilateral relative to the first one of the third calibration points according to the centroid coordinate of the first virtual quadrilateral and a coordinate of the first one of the third calibration points;

offsetting an initial position of a second one of third calibration points adjacent to the first one of the third calibration points according to the first offset, forming a second virtual quadrilateral on a periphery of the second one of the third calibration points with the second one of the third calibration points after offsetting as a center, and acquiring a centroid coordinate of the second virtual quadrilateral based on a displayed grayscale of each sub-pixel in a region surrounded by the second virtual quadrilateral;

acquiring a second offset of the centroid coordinate of the second virtual quadrilateral relative to the second one of the third calibration points according to the centroid coordinate of the second virtual quadrilateral and a coordinate of the second one of the third calibration points;

offsetting an initial position of a third one of the third calibration points adjacent to the second one of the third calibration points according to the second offset, forming a third virtual quadrilateral a periphery of the third one of the third calibration points with the third one of the third calibration points after offsetting as a center, and acquiring a centroid coordinate of the third virtual quadrilateral based on a displayed grayscale of each sub-pixel in a region surrounded by the third virtual quadrilateral;

repeating the above steps to acquire centroid coordinates of all virtual quadrilaterals in the region to be corrected; and determining the centroid coordinate of each of the virtual quadrilaterals as a coordinate of the second calibration point located in the virtual quadrilateral, and acquiring the corrected position of each of the second calibration points in the region to be corrected.

9. A non-transitory computer-readable storage medium having stored thereon instructions that, when executed by one or more processors, cause the one or more processors to execute operations comprising:

controlling the display panel to display a calibration screen to acquire a sampled image of the display panel, the display panel comprising a plurality of first calibration points, and the sampled image comprising a plurality of second calibration points;

acquiring a central calibration point from the plurality of second calibration points;

generating a plurality of third calibration points disposed in an array based on the central calibration point, and dividing the sampled image into a plurality of regions to be corrected;

acquiring a corrected position of each of the second calibration points in any one of the regions to be corrected for an initial position of each of the third calibration points in the region to be corrected;

performing an affine transformation correction on the sampled image based on the corrected positions of all the second calibration points and reference positions of the first calibration points corresponding to respective ones of the second calibration points to acquire a corrected image; and acquiring luminance compensation data based on the corrected image to perform luminance compensation on the display panel with the luminance compensation data;

wherein the instructions for acquiring the corrected position of each of the second calibration points in any one of the regions to be corrected for the initial position of each of the third calibration points in the region to be corrected cause the one or more processors to further execute operations comprising:
  forming a first virtual quadrilateral on a periphery of a first one of the third calibration points adjacent to the central calibration point by taking the first one of the third calibration points as a center, and acquiring a centroid coordinate of the first virtual quadrilateral based on a displayed grayscale of each sub-pixel in a region surrounded by the first virtual quadrilateral;
  acquiring a first offset of the centroid coordinate of the first virtual quadrilateral relative to the first one of the third calibration points according to the centroid coordinate of the first virtual quadrilateral and a coordinate of the first one of the third calibration points;
  offsetting an initial position of each of the third calibration points except the first one of the third calibration points according to the first offset, forming a virtual quadrilateral on a periphery of each of the third calibration points with each of the third calibration points after the offsetting as a center, and acquiring a centroid coordinate of each of the virtual quadrilaterals based on a displayed grayscale of each sub-pixel in a region surrounded by each of the virtual quadrilaterals; and
  determining the centroid coordinate of each of the virtual quadrilaterals as a coordinate of the second calibration point located in the virtual quadrilateral, and acquiring the corrected position of each of the second calibration points in the region to be corrected.

10. The non-transitory computer-readable storage medium according to claim 9, wherein the instructions for acquiring the central calibration point from the plurality of second calibration points cause the one or more processors to further execute operations comprising:
  acquiring a center point of the sampled image and two or more the second calibration points disposed adjacent to the center point of the sampled image;
  acquiring two or more first pitches between the center point and the plurality of the two or more second calibration points; and
  taking a second calibration point having a minimum value among the two or more first pitches as an addressing calibration point, and acquiring a coordinate of the central calibration point from the plurality of the second calibration points according to the addressing calibration point.

11. The non-transitory computer-readable storage medium according to claim 10, wherein the instructions for acquiring the coordinate of the central calibration point among the plurality of second calibration points according to the addressing calibration point cause the one or more processors to further execute operations comprising:
  acquiring a predetermined pitch;
  forming a first region with the addressing calibration point as a center, the predetermined pitch as a breadth of the first region and an extension of the sampled image in a first direction as a length of the first region;
  acquiring a plurality of first coordinate components of a number of first target calibration points among the second calibration points in the first region with respect to the first direction, and taking an intermediate value of the plurality of first coordinate components as a coordinate component of the central calibration point of the sampled image in the first direction;
  forming a second region with the addressing calibration point as the center, the predetermined pitch as a breadth of the second region and an extension of the sampled image in a second direction as a length of the second region;
  acquiring a plurality of second coordinate components of a number of second target calibration points among the second calibration points in the second region with respect to the second direction, and taking an intermediate value of the plurality of second coordinate components as a coordinate component of the central calibration point of the sampled image in the second direction; and
  determining a coordinate of the central calibration point according to the coordinate component of the central calibration point in the first direction and the coordinate component of the central calibration point in the second direction;
  wherein the first direction is parallel to a longer side of the display panel, and the second direction is parallel to a shorter side of the display panel.

12. The non-transitory computer-readable storage medium according to claim 11, wherein after the first region and the second region are formed, sub-pixels in the first region and the second region are subject to binaryzation.

13. The non-transitory computer-readable storage medium according to claim 11, wherein the instructions for acquiring a number of first target calibration points among the second calibration points in the first region and a number of second target calibration points among the second calibration points in the second region cause the one or more processors to further execute operations comprising:
  acquiring a first outer contour of each of the second calibration points in the first region and a second outer contour of each of the second calibration points in the second region; and
  taking the second calibration point whose first outer contour has an area greater than or equal to a first threshold in the first region as one of the first target calibration points, and taking the second calibration point whose second outer contour has an area greater than or equal to the first threshold in the second region as one of the second target calibration points.

14. The non-transitory computer-readable storage medium according to claim 11, wherein the instructions for generating the plurality of third calibration points disposed in the array based on the central calibration point, and dividing the sampled image into the plurality of regions to be corrected cause the one or more processors to further execute operations comprising:
  acquiring a second central calibration point, a third central calibration point, and a fourth central calibration point along the first direction and the second direction, respectively, by taking the central calibration point as a first central calibration point and the predetermined pitch as a point distance, wherein lines connecting centroids of the first central calibration point, the second central calibration point, the third central calibration point, and the fourth central calibration point form a square;
  acquiring an active image region of the sampled image, and dividing the active image region into a first region to be corrected, a second region to be corrected, a third region to be corrected, and a fourth region to be corrected according to the first central calibration point, the second central calibration point, the third central calibration point, and the fourth central calibration point, wherein the first central calibration point is a start point of the first region to be corrected, the second central calibration point is a start point of the second region to be corrected, the third central calibration point is a start point of the third region to be corrected, and the fourth central calibration point is a start point of the fourth region to be corrected; and acquiring coordinates of the plurality of third calibration points arranged in the array within corresponding regions to be corrected along the first direction and the second direction, respectively, by taking the first central calibration point, the second central calibration point, the third central calibration point, and the fourth central calibration point as the starting points and the predetermined pitch as the point distance;

wherein a quantity of the third calibration points, a quantity of the second calibration points, and a quantity of the first calibration points are the same.

15. The non-transitory computer-readable storage medium according to claim 11, wherein the sampled image comprises an active image region and an inactive image region located at a periphery of the active image region, and the instructions for acquiring a predetermined pitch cause the one or more processors to further execute operations comprising:

acquiring a length of the active image region in the first direction and a quantity of sub-pixels in the first direction;

acquiring a pitch of two adjacent ones of the first calibration points; and determining the predetermined pitch according to a product of a quotient of the length of the active image region in the first direction and the quantity of sub-pixels in the first direction with the pitch of the two adjacent ones of the first calibration points.

* * * * *